United States Patent

Hawrylko

[11] Patent Number: 5,536,462
[45] Date of Patent: Jul. 16, 1996

[54] HIGH OUTPUT TWIN SCREW EXTRUSION PROCESS

[75] Inventor: Roman B. Hawrylko, Avon Lake, Ohio

[73] Assignee: The Geon Company, Avon Lake, Ohio

[21] Appl. No.: 279,133

[22] Filed: Jul. 22, 1994

[51] Int. Cl.$^6$ .................................................. B29B 11/10
[52] U.S. Cl. ........................... 264/211.21; 264/211.23; 264/349; 425/203; 425/204; 425/208
[58] Field of Search ..................... 264/211.23, 211.21, 264/349, 176.1; 425/203, 204, 208

[56] References Cited

U.S. PATENT DOCUMENTS

| | | |
|---|---|---|
| 3,678,133 | 7/1972 | Ryan . |
| 3,859,389 | 1/1975 | Carty . |
| 3,882,198 | 5/1975 | Miller . |
| 3,887,519 | 6/1975 | Weisfeld et al. ................. 252/406 |
| 3,919,137 | 11/1975 | Dyer . |
| 3,941,857 | 3/1976 | Wu . |
| 3,983,186 | 9/1976 | Eilers . |
| 3,988,493 | 10/1976 | Yallourakis . |
| 3,991,135 | 11/1976 | Kraft . |
| 4,243,629 | 1/1981 | Tramezzani .................... 264/349 |
| 4,246,150 | 1/1981 | Bower ............................ 264/211 |
| 4,544,694 | 10/1985 | Bower ............................ 524/385 |
| 4,665,118 | 5/1987 | Bourland ........................ 524/394 |
| 4,773,763 | 9/1988 | Weber ............................. 425/208 |
| 4,994,223 | 2/1991 | Hestehave et al. ............. 264/349 |
| 5,000,900 | 3/1991 | Baumgartner .................. 425/204 |
| 5,076,777 | 12/1991 | Schmitt .......................... 264/39 |
| 5,194,471 | 3/1993 | Hartitz ............................ 524/180 |
| 5,198,170 | 3/1993 | Hawrylko . |
| 5,232,280 | 8/1993 | Moriyama ...................... 425/204 |

FOREIGN PATENT DOCUMENTS

| | | | |
|---|---|---|---|
| 2749101 | 5/1979 | Germany | 264/349 |

OTHER PUBLICATIONS

Processing Aids for Poly(Vinyl Chloride), Journal of Vinyl Technology, Jun. 1993, vol. 15, No. 2.
External Lubricants that Speed Fusion, by Robert Lindner, Allied Signal; Sep. 1989.
Conical Twin Screw Extruders, Davis Standard; Jul. 1994.

Primary Examiner—Jeffery R. Thurlow
Attorney, Agent, or Firm—Miles B. Dearth

[57] ABSTRACT

A process for the extrusion of rigid PVC profile other than pipe is disclosed in a twin conical screw extruder, equipped with high shear screws. The process includes extruding a compound specially adapted for the process, the compound contains a polyvinyl chloride resin with an average particle size of from 130 to about 200 microns, a lubricant system containing no more than about 3.5 parts of one or more lubricants, an organo metal salt, from 0 to less than 0.75 parts of a polymeric processing aid, at least one filler/pigment, and a stabilizer for PVC. The process achieves extrudate surfaces characterized by a smooth, dull finish. The process advantageously operates at high extrusion output rates under the conditions specified.

13 Claims, 3 Drawing Sheets

HIGH OUTPUT TWIN SCREW EXTRUSION PROCESS

FIELD OF THE INVENTION

The present invention pertains to the conical twin screw extrusion of profiles made from rigid polyvinyl chloride.

BACKGROUND OF THE INVENTION

U.S. Pat. No. 5,198,170 teaches the manufacture of extruded profiles directly from powder or from preprocessed cubes. The obtention of smooth dull surface characteristics is found in the selection of small particle size and low friability PVC resin extruded in a relatively low extrusion stock temperature range as well as using a relatively higher extrusion stock temperature range with a compound containing a less friable resin. There is no teaching on the effects of using different twin screws on extrudate surface characteristics. The precise degree of work history required in the direct twin screw extrusion of profiles from powder PVC compound occurs within a narrow process window when one desires a surface texture which is smooth and dull. Where a higher extrusion output is wanted, the process window shifts, requiring modifications. According to U.S. Pat. No. 5,198,170 it is suggested that low shear extrusion screws be used. The acceptable surface characteristics of an extruded profile is a smooth but dull surface. A glossy surface is not desired. A smooth dull surface is obtained by achieving predominately primary particle flow in the melt. This means that fusion is not complete and particle flow still predominates. It is known that if too high fusion is obtained, the extruded profile becomes glossier, exhibits more orange peel, is more difficult to, and retain part dimension, and with too much stress this later can cause warpage in use. In the direct powder extrusion of compounds suggested in U.S. Pat. No. 5,198,170 wherein the PVC resin has a small particle size of up to 125 microns, it has been observed that these powder compounds have low bulk density. The low bulk density is a primary factor in limiting the output rate of extrusion. Therefore, powder compounds having high bulk density are desired where higher extrusion rates are needed.

Recently, efforts have been made to achieve higher extrusion output. Conical twin screws have just been introduced in the industry which create a higher rate of work level (high shear). It has been found that prior art powder formulations can be used to extrude acceptable looking profiles using these new screw designs, however the output rate must be substantially reduced in order to do this. It has thus been observed that PVC compounds suggested in the prior art do not work in the high output process window available with higher shear conical twin screws. As higher extrusion output rate is desirable, it would therefore be advantageous to provide a higher shear, high output twin screw extrusion process for making profiles other than pipe, especially vertical louver slats, having the desired surface aesthetics.

SUMMARY OF THE INVENTION

In accordance with the invention there is provided a process for the extrusion of rigid PVC profile, other than pipe, using a conical twin screw extruder equipped with high shear screws. The process comprises extruding a compound with an extruder equipped with high shear conical twin screws using a compound specially adapted for the process, the compound comprising a polyvinyl chloride resin with an average particle size of from 130 to about 200 microns, a lubricant system containing no more than about 3.5 parts of one or more lubricants, an organo metal salt, from 0 to less than 0.75 parts of a polymeric processing aid, at least one filler/pigment, and a stabilizer for PVC. The process achieves acceptable surface appearance at high output rates under the conditions specified hereinbelow.

DETAILED DESCRIPTION

Figure 1:
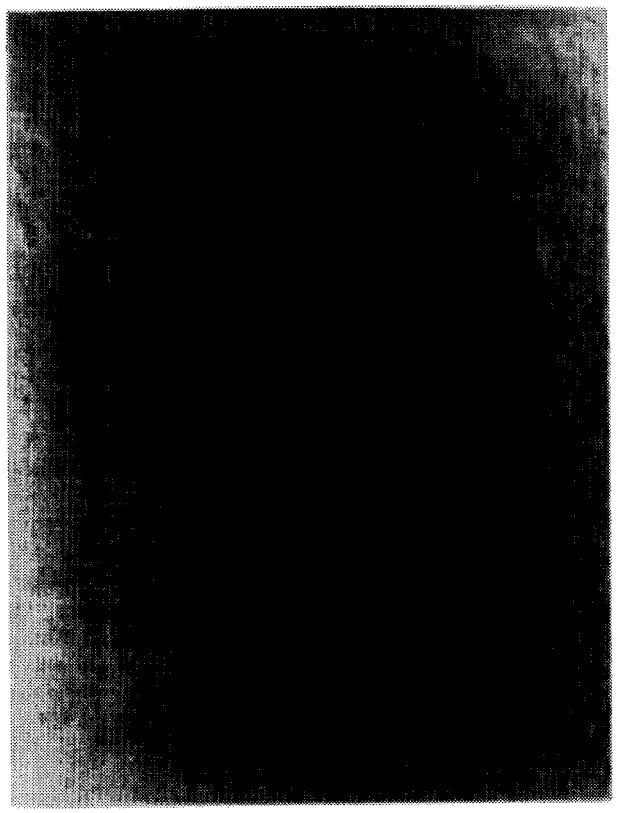
FIG. 1 is a photo micrograph at 2.6× magnification of the surface of an extrudate made using medium shear screws with the compound of example 1, extruded with a twin screw extruder at 80 feet per minute.

The process of this invention pertains to direct powder extrusion of rigid polyvinyl chloride. Rigid polyvinyl chloride is a material which exhibits a degree of rigidity, in terms of modulus of above 200,000 psi per ASTM D-747. A rigid PVC compound could contain up to about 10 parts of a softening agent such as plasticizer, however beyond this level, the rigidity would drop below about 200,000 psi and would be essentially commercially inapplicable. The term "powder compound" refers to a particulate formulation of PVC resin particles admixed with other ingredients and is generally a free flowing powder. The PVC resin grains are agglomerated and porous. Some liquid components are adsorbed through a mixing process referred to in the art as "dry blending". All parts expressed herein mean weight parts per 100 weight parts of PVC resin.

POWDER COMPOUNDS

The powder compounds used herein contain effective amounts of conventional components however there are particular limitations specified below which unexpectedly affect the surface characteristics of a smooth and dull finish, and must be observed in order to achieve the accepted finish. For example, various primary and/or secondary lubricants such as oxidized polyethylene, high melt flow polypropylene, paraffin wax, fatty acids, and fatty esters and the like can be utilized. Thermal and UV stabilizers can be utilized such as various organo tins, for example dibutyl tin, dibutyltin-S-S'-bi-(isooctylmercaptoacetate), dibutyl tin dilaurate, dimethyl tin diisooctyl-thioglycolate. Secondary stabilizers may be included for example a metal salt of phosphoric acid, polyols, and epoxidized oils. Specific examples of salts include water-soluble, alkali metal phosphate salts, disodium hydrogen phosphate, orthophosphates such as mono-, di-, and tri-orthophosphates of said alkali metals, alkali metal polyphosphates, -tetrapolyphosphates and -metaphosphates and the like. Polyols such as sugar alcohols, and epoxides such as epoxidized soya oil can be used. Typical levels of secondary stabilizers range from about 0 wt. parts to about 5 wt. parts per 100 wt. parts PVC (phr). In addition, antioxidants such as phenolics, BHT, BHA, various hindered phenols and various inhibitors like substituted benzophenones can be utilized.

When increased impact values are desired, impact modifiers can be included which are known to the art. For example, various impact modifiers are set forth in The Encyclopedia of PVC, Volume 2, Chapter 12, Marcel Dekker, Inc., New York, 1977, which is hereby incorporated by reference. Specific examples of impact modifiers include various acrylonitrile-butadienestyrene (ABS) polymers, the various chlorinated polyethylenes, the various graft copolymers of acrylic rubbers, the various poly(ethylene-co-vinyl acetates), styrene-butadiene-styrene block copolymers, graft copolymers of methylmethacrylate, butadiene and styrene (MBS), graft copolymers of acrylonitrile, butadiene and styrene (ABS) and the like. Impact modifiers of these types are commercially available. Preferred impact modifiers include ABS, MBS, graft copolymers of acrylic rubbers, chlorinated polyethylene and mixtures. Regardless of the particular impact modifier utilized, the amounts thereof can naturally vary, depending upon the desired impact strength as typically measured by an Izod impact test (ASTM D256). The levels of impact modifier present typically vary from about 3 to about 30 phr. Accordingly, articles derived from the powder compounds of the present invention have the capacity to be impact-modified to achieve notched Izod values generally in excess of 100 N.m/m if desired.

A recent article appeared in the *Journal of Vinyl Technology*, entitled *Processing Aids for Poly (Vinyl Chloride)*, June 1993, Vol. 15, No. 2. The authors teach that in most applications, rigid PVC cannot be processed without a process aid. They mention that even as higher porosity PVC resins can be used with improved fusion, processing PVC without processing aids is almost impossible. The principle types of polymers suggested as process aids are listed below.
Methyl methacrylate (MMA)/styrene copolymers,
Copolymers of acrylate methacrylates and n-vinyllactam,
Copolymers of MMA and glycidyl methacrylate,
Copolymers of MMA and alkyl acrylates,
MMA/isobornyl methacrylate,
MMA/acrylonitrile/alkyl acrylate terpolymers,
MMA/alkyl acrylate core/shell polymers,
PVC/MMA alkyl acrylate graft polymers,
Styrene/acrylonitrile copolymers,
Alpha-methylstyrene/acrylonitrile/styrene polymers,
Organopolysiloxane,
Low molecular weight polystyrene,
Polyesters of propylene terephthalate,
Styrene/acrylonitrile/t-butyl acrylamide,
Terpolymers of ethylene/vinyl acetate/sulfur dioxide,
PVC/methacrylonitrile interpolymers,
PVC/alkyl acrylate graft polymers,
Propylene/acrylic graft polymers,
Poly(alpha-methylstyrene), and
Poly(alkylene carbonate(s).

In the process of the invention it was found that inclusion of process aid had the opposite effect than what was expected. In the present process, process aid must be absent or present up to 0.75 parts. Preferably process aid is limited to from 0 to 0.25 parts.

The particulate characteristics of PVC resins suitable herein are preferably an average particle size of from 130 to 200 microns, and an inherent viscosity per ASTM D-1243 of from 0.80 to 1.0. Resin particle size can be characterized by a variety of established methods. A preferred range of average particle size is from 150 to 180 microns. ASTM D1705-1 illustrates the wet screen analysis method. ASTM D1921-63 illustrates the dry screen analysis method. PVC grain porosity is not critical and can range from about 0.27 cc DOP per gram sample of resin (cc/gm) to about 0.5 cc/gm.

Examples of fillers include calcium carbonate, clay, silica and various silicates, talc, carbon black and the like. Such fillers are generally added in amounts of from about 3 to about 100 phr of PVC. Preferably from 3 to 50 phr of filler are employed for extruded profiles such as louvers. Examples of various pigments include titanium dioxide, carbon black and the like. Mixtures of fillers and pigments are preferred.

Lubricants are essential for metal release and in controlling fusion characteristics in the present extrusion process. The particular lubricant or a combination of lubricants is not critical provided that the total level of lubricant does not exceed an amount which causes excessive die lip build up. In the process window practiced in this invention the total amount of lubricant should not exceed about 3.5 parts by weight per 100 parts by weight PVC. In some process conditions it is preferred to reduce the level of lubricant to 3 parts because a higher level would likely produce die build up. In the process conditions of the highest extruder output rates relatively higher lubricant levels can be used. The 3.5 part limit on lubricant excludes the amount of organo metal salt.

There are several classes of effective lubricants, among which there are the parrafin waxes, the ester waxes, the fatty amides, the mineral waxes and others known and used in the art. The ester waxes include linear aliphatic esters, glycol esters and glycerol esters like ethylene glycol carboxylic acid ester and propylene glycol carboxylic acid ester. Also included are oligomeric glycol esters or oligo-glycerol esters. Specific examples include glycerol mono 2-ethylhexanoate, glycerol monooleate, diglycerol monostearate, triglycerol mono stearate, a polyglycerol ester of a $C_8$ to $C_{22}$ carboxylic acid such as hexaglycerol mono stearate, hexaglycerol distearate, or any of the glycerol, diglycerol, triglycerol or polyglycerol partial esters of oleic acid. Preferred are the mono esters derived from the reaction of glycerine and a $C_8$ to $C_{25}$ carboxylic acid, with more preferred versions being mono-$C_{16}$ to $C_{18}$ esters of glycerol such as glycerol monostearate and glycerol monooleate. Glycerol esters such as Loxiol® G-60, a dicarboxylic acid ester of saturated aliphatic alcohol are available commercially from Henkel Corporation, Pennsylvania, U.S.A.

The parrafin lubricants include paraffin oils, like mineral oil, microcrystalline parrafin wax, or parrafin wax, and low molecular weight polyolefin such as polyethylene wax, either in liquid, powder or flakes. These are commercially available from Sonneborn Division of Witco Chem. Co., Inc., and Penreco Inc., Union Oil Co., Inc., and Frank B. Cross, Co., Inc..

Optional lubricating components include epoxide containing materials like epoxidized oils, epoxidized linseed oil, epoxidized tall oil, epoxidized soy oil, and epoxy materials based on bisphenol A, for example, the reaction product of epichlorohydrin and bisphenol-A. Generally as liquids or meltable solids, epoxy materials include diglycidyl ether of bisphenol A, having molecular weight above about 370° F.

A variety of commercial sources for epoxy containing materials is listed in *Chemical Week Buyers' Guide,* October, 1990. Some are available under the Epon® trademark of Shell Chemical Co., Inc..

The mineral waxes include oxidized polyethylene, montan wax, peat wax, blends of paraffin and microcrystalline waxes, and petroleum wax. One such mineral wax is referred to as montan ester waxes, and typically comprises mixtures of long chain acids, long chain esters and resinous portions. Reference is made to Kirk-Othmer *Encyclopedia of Chemical Technology,* Wiley Interscience, Vol. 23, 1978, Pg. 471. Oxidized polyethylene wax is commercially sold as a fusion promoting lubricant by Allied Chemical, Inc.

In the present invention a combination of the lubricant and a organo metal salt is essential. The following lubricant systems are suggestive of those which will provide acceptable extrusions:

1. A lubricant system containing 0.1 to 1.25 parts by weight oxidized polyethylene (high melting) and 0.25 to 1.4 parts of an internal lubricant such as an aliphatic ester wax, polyethylene and internal lubricant should not exceed 3.5 parts; from 0 to 0.25 parts of acrylic process aid; and from 1.6 to 3.5 parts of organo metal salt such as preferred calcium stearate. A similar compound is disclosed in *External Lubricants that Speed Fusion,* Robert A. Lindner, Plastics Compounding, Sep.–Oct., 1989.
2. A lubricant system containing up to 3.5 parts of an aliphatic ester wax; in combination with organo metal salt such as calcium stearate.
3. A lubricant system containing 0 to 0.5 parts of oxidized polyethylene and a up to 3.5 parts of parrafin wax; in combination with organo metal salt such as calcium stearate.
4. A lubricant system containing up to 3.5 parts of a monoalkyl ester of glycerol, such as glycerol monooleate; in combination with calcium stearate.

The organo metal salts can be salts of any metal of Group II of the Periodic Table, such as zinc, calcium, cadmium, barium, magnesium and strontium, as well as lead tin, aluminum, zirconium and antiomony. The organo portion is a carboxylic acid and ordinarily contains from about six to about twenty-four carbon atoms, and can be any organic non-nitrogenous carboxylic acid. The aliphatic, aromatic, alicyclic and oxygen-containing heterocyclic organic acids are operable as a class. By the term "aliphatic acid" is meant any open-chain carboxylic acid, substituted, if desired, with nonreactive groups, such as halogen, sulfur and hydroxyl. By the term "alicyclic" it will be understood that there is intended any cyclic acid in which the ring is nonaromatic and composed solely of carbon atoms, and such acids may, if desired have inert, nonreactive substituents such as halogen, hydroxyl, alkyl radicals, alkenyl radicals and other carbocyclic ring structures condensed therewith. The oxygen-containing heterocyclic compounds can be aromatic or nonaromatic and can include oxygen and carbon in the ring structure, such as alkyl-substituted furoic acid. The aromatic acids likewise can have nonreactive ring substitutents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, pelagonic acid, neodecanoic acid, capric acid, undecylic acid, lauric acid, myristic acid, palmitic acid, margaric acid, stearic acid, 12-hydroxysteraric acid, oleic acid, ricinoleic acid, erucic acid, behenic acid, chlorcaproic acid, hydroxy capric acid, benzoic acid, salicylic acid, 5-t-octyl salicylic acid, maphtoic acid, 1-naphthenic acids derived from petroleum, abietic acid, dihydroabietic acid, hexahydrobenzoic acid, and methyl furoic acid, as well as partially esterfied dibasic acids such as monobutyphthalate, isooctylmaleate and 2-ethoxyethyl maleate. Specific examples of organo metal salts are calcium stearate, lithium stearate, tin stearate, and lead stearate.

Plasticizers may be included at up to 10 parts. Exemplary plasticizers are set forth in *The Technology of Plasticizers,* by Sears and Darby, pages 893–1085, John Wiley and Sons, New York, 1982, which is incorporated herein by reference. Plasticizers are preferably absent.

Process Conditions and Twin Screw Design

The twin screw extrusion process herein requires high shear conical twin screws. High shear conditions are brought about by the screw design. Twin screws are designed with a feed or mastication section at the back end where powder is fed, and the metering section toward the front (die) end where masticated thermoplastic is conveyed toward the die. The die end is referred to as the front end. Venting of gases occurs at a point typically from the forward portion of the feed or mastication section to the rear portion of the metering section.

High shear screws provide compression of the powder compound. Compression is provided either by decreasing the screw flight depth or the lead or a combination of both. The degree of compression can be either single or double compression. The term "high shear" also includes what is referred to now in the industry as the term "ultra high shear". Ultra high shear screws have preferably double compression. Referring now to the feed section, there are two stages, the first stage and the second stage. A high shear twin screw design is exemplified by single compression in the first stage and slotted flights (or back cut flights) toward the front end of the feed section. The depth of the slots can be from a few millimeters up to the entire depth of the flight down to the root member. Slots which are cut in the flights are either excavations in the side of the flight or slots which are cut through the flight. Slots allow back flow of the masticating melt, increase the shear action and turbulence of mixing. An "ultra" high shear screw is exemplified by double compression and deep slots cut in the flights in both the first and second stages of the feed section. "Ultra" high shear screws may contain one, two or more rows of mixings pins. In the area occupied by mixing pins, there are no screw flights. Just before and just after a section containing mixing pins, the screw flight is usually a half flight.

The preferred high shear and "ultra" high shear twin screws are now commercially available from Davis Standard®, a division of Crompton and Knowles Corp., under the part numbers 350754 and 350734, respectively for use with a model GC-8, a 61 mm twin screw extruder. Part numbers 350750 and 350731 refer to high shear and "ultra" high shear twin screws, respectively, for use with a model GC-6 a 41 mm twin screw extruder available from Davis Standard®.

The process of the present invention is readily adapted for co-extrusion. Co-extrusion of grooved clear-edge louvers is disclosed in U.S. Pat. No. 4,628,980. The grooved or clear edged louver is typically embodied as flanges and provide for a decorative panel insert. The body of the louver inward of the clear edges is formed using the compounds adapted herein for the conical twin high shear screw process. The co-extrusion is provided by passing two melt streams through a slotted die. Slotted dies can be fabricated by skilled practitioners and utilized in a conventional manner with the exception that in the process of extruding the slat or flat portion between the edges, a conical twin screw set must contain the high shear screws and the processing conditions noted herein below should be followed.

In the direct powder multi-screw extrusion method of this invention the process window is achieved with a stock temperature in the range of from 360° F. to 400° F. If the stock temperature exceeds about 400° F., the extrudate exhibits excessive fusion resulting in increased gloss, higher internal stresses, and lower melt strength, requiring greater care in sizing the emerging extrudate. These temperature ranges are suitable for single meet extrusions, not co-extrusions. The temperature ranges in the heating zones are 320°–350° F. in the rear zones and 290°–325° F. in the front zones. The range of RPM of the counter-rotating screws should be from 5 to 30. A low inventory die is preferred over a high inventory die. The term "high output" refers to line speeds in the range of about 50 to 125 feet of extrudate per minute.

Twin-Screw Extrusion Examples

In the examples, a Davis Standard® GC-8 conical twin screw extruder is used to compare powder PVC compounds formulated as listed in the table below.

In all examples a breaker plate and screen pack was attached at the output end of the screws. The screen pack contained 3 screens of 20, 40, and 20 mesh.

TABLE 1

| Components | EXAMPLES | | | | | |
| --- | --- | --- | --- | --- | --- | --- |
|  | 1 | 2 | 3 | 4 | 5 | 6 |
| PVC (I.V. 0.9) | 100 | 100 | 100 | 100 | 100 | 100 |
| Stabilizer | 1 | 1 | 1 | 1 | 1 | 1 |
| Filler (CaCo$_3$) | 20 | 20 | 20 | 10 | 20 | 20 |
| TiO$_2$ | 11 | 11 | 11 | 11 | 11 | 11 |
| Ca Stearate | 3.3 | 3.3 | 3.3 | 3.3 | 3.3 | 3.3 |
| Stearyl Amide Wax | 2.5 | 2.5 | 2.5 | 2.0 | 2.5 | 2.5 |
| Parrafin Wax | 0.3 | 0.3 | 0.3 | 0.3 | 0.3 | 0.3 |
| Acrylic Process Aid | 0.25 | 0.25 | 1.0 | 3.0 | 0.25 | 0.25 |

TABLE 2

| Conditions | EXAMPLES | | | | | |
| --- | --- | --- | --- | --- | --- | --- |
|  | 1 | 2 | 3 | 4 | 5 | 6 |
| Zone 1 Temp °F. | 340 | 340 | 340 | 340 | 340 | 335 |
| Zone 2 Temp °F. | 340 | 340 | 340 | 340 | 340 | 335 |
| Zone 3 Temp °F. | 290 | 290 | 290 | 315 | 325 | 305 |
| Zone 4 Temp °F. | 290 | 290 | 290 | 315 | 325 | 305 |
| RPM | 15 | 18 | 19.5 | 15 | 9.7 | 4.2 |
| Stock Temp. °F. | 337 | — | 388 | 390 | 380 | 370 |
| Output ft/min. | 80 | 90 | 93 | 80 | 50 | 70 |
| Screw Type | med | med | med | med | high | high |
| Die Temp. °F. | see note 1 | | | | 325 | 320 |

Note 1
Die temp. °F. - Examples 1–4, high inventory die-temp range 340–345° F.

Figure 2:
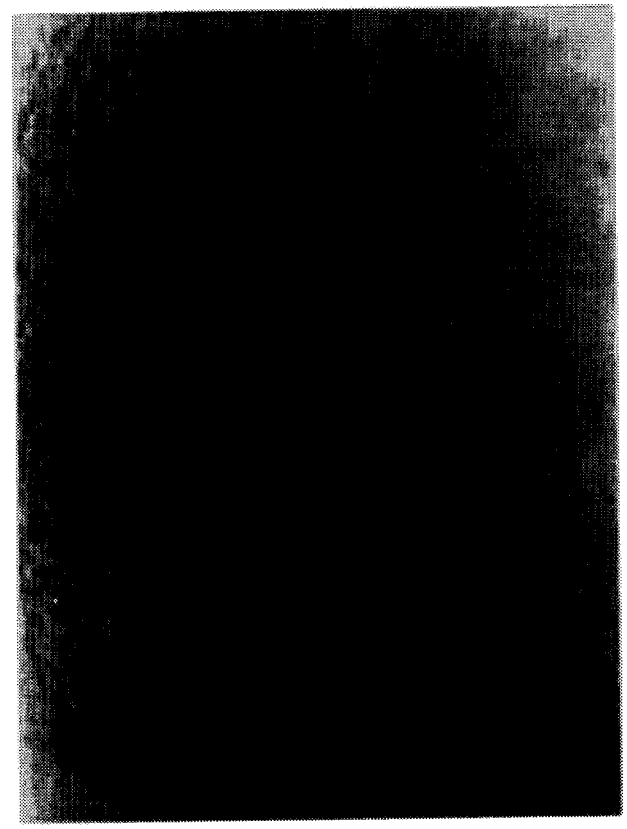
FIG. 2 is a photo micrograph at 2.6× magnification of the surface of an extrudate made using medium shear screws with the compound of example 2, extruded with a twin screw extruder at 90 feet per minute.
Figure 3:
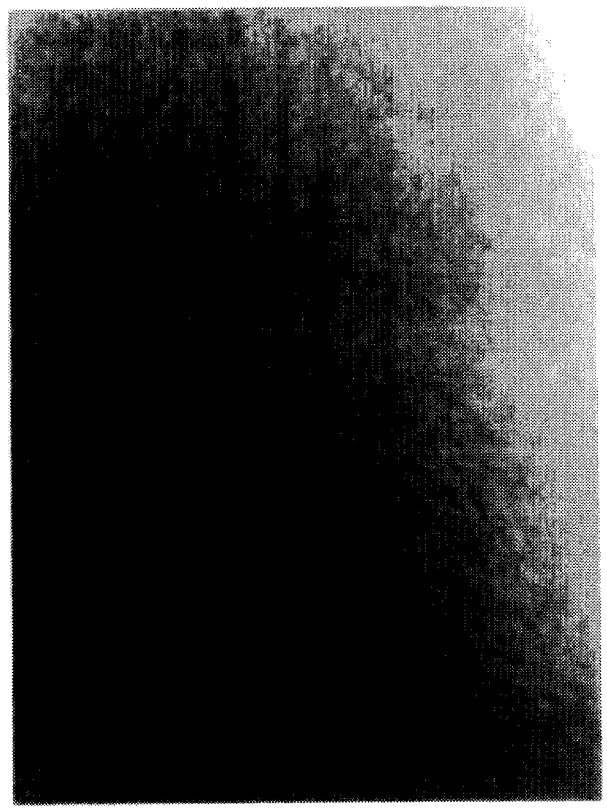
FIG. 3 is a photo micrograph at 2.6× magnification of the surface of an extrudate made using medium shear screws with the compound of example 3, extruded with a twin screw extruder at 93 feet per minute.
Figure 4:
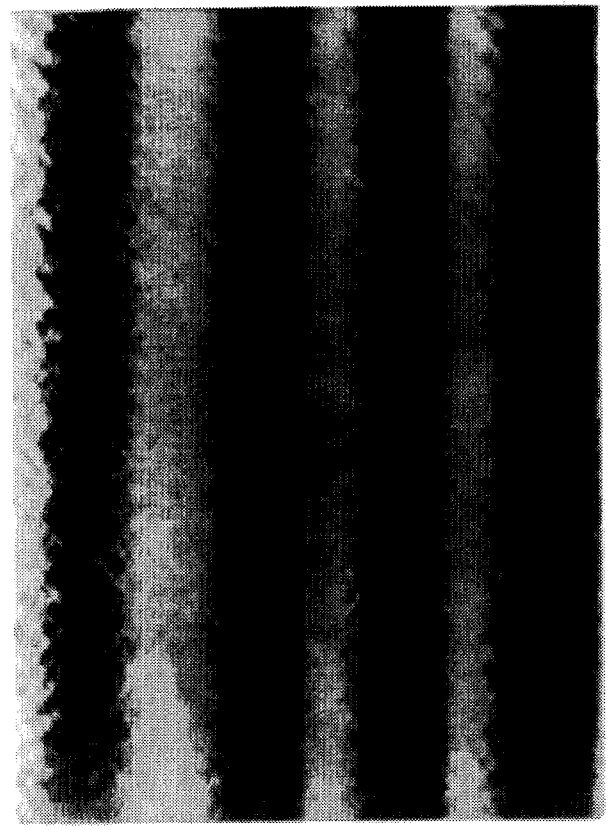
FIG. 4 is a photo micrograph at 2.6× magnification of the surface of an extrudate made using medium shear screws with the compound of example 4, extruded with a twin screw extruder at 80 feet per minute.
Figure 5:
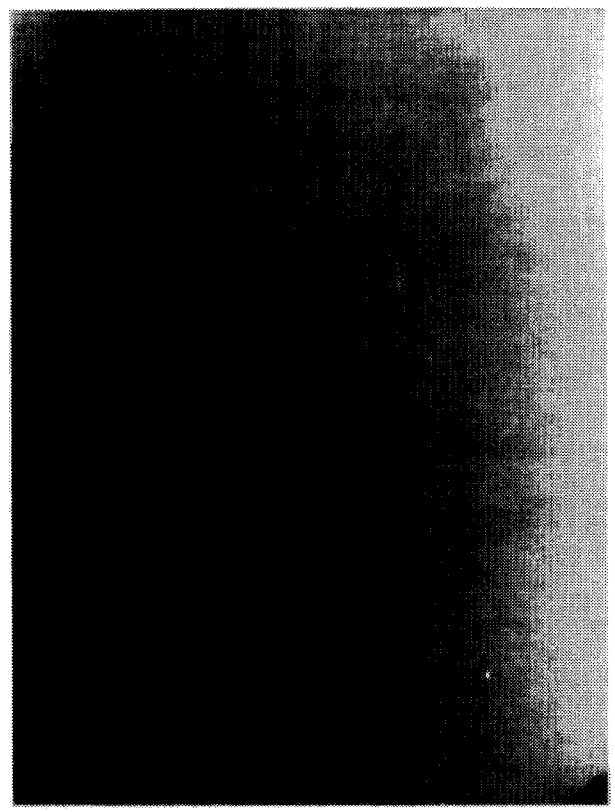
FIG. 5 is a photo micrograph at 2.6× magnification of the surface of an extrudate made using high shear screws with the compound of example 5, extruded with a twin screw extruder at 50 feet per minute.
Figure 6:
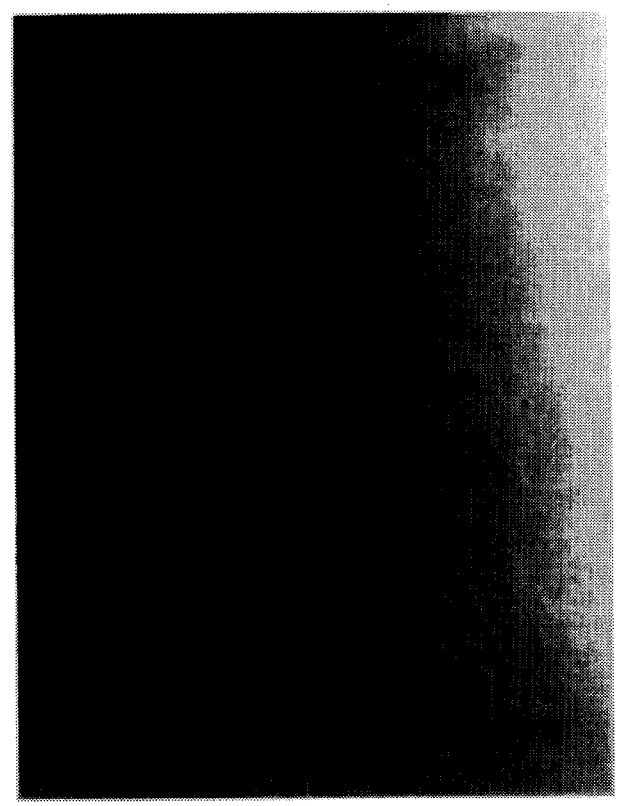
FIG. 6 is a photo micrograph at 2.6× magnification of the surface of an extrudate made using high shear screws with the compound of example 6, extruded with a twin screw extruder at 70 feet per minute.

Referring to the figures, FIG. 1 is a photo micrograph of the surface of an extrudate of Example 1, listed in Table 1. The extrusion conditions are listed in Table 2. Likewise, FIGS. 2–6 refer to Examples 2–6. FIGS. 1–4 illustrate unacceptable surfaces. They show excessive orange peel. The formulations of Examples 1–4 show unexpectedly that polymeric process aid interferes with obtention of surface smoothness in extrusion using lower shear screws. Examples 5 and 6 are identical to Examples 1 and 2. FIGS. 1 and 2 can be compared with FIGS. 5 and 6 with the sole difference being the type of twin screws used. FIGS. 5 and 6 show unexpected improvements in the extrudate surfaces, both of which are commercially acceptable. FIGS. 1 and 2 are unacceptable. Examples 5 and 6 were extruded with an high shear twin screw which contained double compression, and slots cut in the first and second stage flights plus two rows of mixing pins. It is likely that where slots are cut in stage one and two flights, mixing pins may be omitted and acceptable extrudate surfaces are obtainable.

I claim:

1. A process for the extrusion of rigid PVC profiles other than pipe having a smooth dull finish, comprising feeding a rigid powder PVC thermoplastic stock into a conical twin screw extruder, extruding
said thermoplastic stock in said extruder which is equipped with high shear, counter-rotating, conical twin screws and wherein said twin screws provide single or double compression, and slotted or back-cut flights in the feed section, said stock is extruded under conditions providing a temperature of said stock at the die in a range of from 360° F. to 400° F., said stock comprises a rigid polyvinyl chloride resin with an average particle size of from 130 to about 200 microns, no more than about 3.5 parts of at least one lubricant, an organo metal salt, a stabilizer, a filler or pigment, and from 0 to less than 0.75 parts of a polymeric process aid, all parts are weight parts per 100 weight parts of said PVC resin.

2. The process of claim 1 wherein said resin has an average particle size of 150 to 180 microns.

3. The process of claim 1 wherein said stock contains from 0 to 0.25 parts of said polymeric process aid.

4. The process of claim 1 wherein said stock contains upto 3 parts of said at least one lubricant.

5. The process of claim 1 wherein said stock consists essentially of:

100 weight parts PVC, 0.5–5 weight parts of a stabilizer,

5–50 weight parts of a filler,

1–20 weight parts of TiO$_2$, 0.5–5 weight parts of an organo metal salt, 0.1–3.5 weight parts of a lubricant, and 0–0.75 weight parts of a polymeric process aid.

6. The process of claim 5 wherein said stock consists essentially of:

100 weight parts PVC, 0.5–1.5 weight parts of a stabilizer,

15–30 weight parts of a filler,

5–15 weight parts of TiO$_2$, 1.5–3.5 weight parts of an organo metal salt, 1.5–3.0 weight parts of a lubricant, and 0–0.25 weight parts of a polymeric process aid.

7. The process of claim 1 wherein said high shear screw contains slots cut in some of the feed section flights.

8. The process of claim 7 wherein said high shear screw further contains at least one row of mixing pins.

9. A method of use for direct feeding of a rigid powder PVC compound into a twin screw extruder equipped with high shear conical twin screws for making profiles, other than pipe, that exhibit a smooth dull surface, said compound comprising:

100 weight parts PVC,
0.5–5 weight parts of a stabilizer,
5–50 weight parts of a filler,
1–20 weight parts of $TiO_2$,
0.5–5 weight parts of an organo metal salt,
0.1–3.5 weight parts of at least one lubricant, and
0–0.75 weight parts of a polymeric process aid and wherein said twin screws provide single or double compression, and slotted or back-cut flights in the feed section.

10. The method of claim 9 wherein said powder PVC compound comprises:
100 weight parts PVC,
0.5–1.5 weight parts of a stabilizer,
15–30 weight parts of a filler,
5–15 weight parts of $TiO_2$,
1.5–3.5 weight parts of an organo metal salt,
1.5–3.0 weight parts of a lubricant, and
0–0.25 weight parts of a polymeric process aid.

11. The method of claim 9 wherein said PVC has an I.V. of from 0.8 to 1.0, and said stabilizer is selected from the group consisting of organotin stabilizers, lead stabilizers and mixed metal stabilizers.

12. The method of claim 9 wherein said organo metal salt is a group II metal salt of a $C_8$ to $C_{25}$ carboxylic acid.

13. The method of claim 9 wherein said lubricant is present at up to 3 parts and selected from the group consisting of a parrafin, an ester wax, a fatty amide, and a mineral wax.

* * * * *